(12) United States Patent
Hayashi

(10) Patent No.: US 11,745,448 B2
(45) Date of Patent: Sep. 5, 2023

(54) METHOD FOR MANUFACTURING COMPOSITE MATERIAL PRODUCT

(71) Applicant: FUTURE TECHNOLOGY CO., LTD., Tokyo (JP)

(72) Inventor: Koji Hayashi, Tokyo (JP)

(73) Assignee: FUTURE TECHNOLOGY CO., LTD., Tokyo (JP)

( * ) Notice: Subject to any disclaimer, the term of this patent is extended or adjusted under 35 U.S.C. 154(b) by 153 days.

(21) Appl. No.: 16/969,553

(22) PCT Filed: Feb. 22, 2018

(86) PCT No.: PCT/JP2018/006403
§ 371 (c)(1),
(2) Date: Aug. 12, 2020

(87) PCT Pub. No.: WO2019/163046
PCT Pub. Date: Aug. 29, 2019

(65) Prior Publication Data
US 2021/0001576 A1    Jan. 7, 2021

(51) Int. Cl.
| | | |
|---|---|---|
| *B29C 70/00* | (2006.01) | |
| *B32B 5/00* | (2006.01) | |
| *B32B 29/00* | (2006.01) | |
| *B29C 70/68* | (2006.01) | |
| *B29C 70/48* | (2006.01) | |
| *B32B 5/02* | (2006.01) | |
| *B32B 5/06* | (2006.01) | |
| *B32B 5/26* | (2006.01) | |
| *B32B 29/02* | (2006.01) | |
| *B29K 101/12* | (2006.01) | |

(52) U.S. Cl.
CPC ............ *B29C 70/682* (2013.01); *B29C 70/48* (2013.01); *B32B 5/024* (2013.01); *B32B 5/06* (2013.01); *B32B 5/26* (2013.01); *B32B 29/02* (2013.01); *B29K 2101/12* (2013.01); *B32B 2260/046* (2013.01)

(58) Field of Classification Search
CPC ......... B29C 70/00; B29C 70/40; B29C 70/48; B29C 70/60; B29C 70/68; B29C 70/682; B32B 5/00; B32B 5/02; B32B 5/024; B32B 5/06; B32B 5/20; B32B 5/26; B32B 29/00; B32B 29/02
See application file for complete search history.

(56) References Cited

U.S. PATENT DOCUMENTS

| | | | |
|---|---|---|---|
| 2009/0050259 A1* | 2/2009 | Joern .................... | B32B 27/08 156/181 |
| 2011/0287212 A1 | 11/2011 | Miloslavsky | |
| 2016/0194792 A1* | 7/2016 | Satharasinghe ........ | H05K 1/038 428/102 |

FOREIGN PATENT DOCUMENTS

| | | |
|---|---|---|
| CN | 103072285 A | 5/2013 |
| JP | S60-11339 A | 1/1985 |
| JP | H11-168321 A | 6/1999 |
| JP | 2002-015490 A | 5/2002 |
| JP | 2013-091252 A | 5/2013 |
| JP | 2015-509457 A | 3/2015 |
| WO | 2011/125596 A1 | 10/2011 |

OTHER PUBLICATIONS

International Search Report issued in PCT/JP2018/006403, dated Mar. 27, 2018.
Written Opinion of the International Searching Authority issued in PCT/JP2018/006403, dated Mar. 27, 2018.
Taiwanese Office Action dated Feb. 20, 2019, in the corresponding Taiwanese Application No. 107114971.
European Search Report issued in Application No. PCT/JP2018/006403, dated Aug. 26, 2021.

* cited by examiner

*Primary Examiner* — Jacob T Minskey
*Assistant Examiner* — Matthew Hoover
(74) *Attorney, Agent, or Firm* — BEDNAREK LEGAL, PLLC

(57) ABSTRACT

Provided is a technology for imparting a design having a higher degree of freedom than in the related art to a composite material product including a woven fabric, which is formed of a thread made of a specific fiber (carbon fiber, glass fiber, aramid fiber), and a resin. As a first step, a specific fiber cloth (100), which is the woven fabric formed of the thread made of a specific fiber, and a backing sheet (200) formed of a thermoplastic resin are stacked. Subsequently, embroidery is performed with an embroidery thread (300) to form a design on a front surface of the specific fiber cloth (100). The embroidery thread (300) is made of the specific fiber, and penetrates through the specific fiber cloth (100) and the backing sheet (200). Then, the specific fiber cloth (100) and the backing sheet (200) are sandwiched between resin sheets (400) each formed of a thermoplastic resin, and the whole is cured by an RFI method.

7 Claims, 7 Drawing Sheets

METHOD FOR MANUFACTURING COMPOSITE MATERIAL PRODUCT

TECHNICAL FIELD

The present invention relates to a method of manufacturing a composite material product.

BACKGROUND ART

In the present application, the wording "specific fiber" means a collective term for a carbon fiber, a glass fiber, and an aramid fiber. In addition, in the present application, the wording "thread made of a specific fiber" means a thread made of at least one of the carbon fiber, the aramid fiber, or the glass fiber. Of course, a thread made of two or more of the carbon fiber, the aramid fiber, and the glass fiber also falls within the category of the thread made of a specific fiber.

The specific fiber, or the thread made of a specific fiber is mostly used for industrial use. A well-known example of such use is a composite material product using a cloth, which is produced using the thread made of a specific fiber, and a resin. The composite material product is referred to, for example, as follows: a composite material product that is a combination of a cloth, which is produced using a thread made of the carbon fiber, and a resin is referred to as carbon fiber-reinforced plastic; a composite material product that is a combination of a cloth, which is produced using a thread made of the glass fiber, and a resin is referred to as glass fiber-reinforced plastic; and a composite material product that is a combination of a cloth, which is produced using a thread made of the aramid fiber, and a resin is referred to as aramid fiber-reinforced plastic. Those composite material products are collectively referred to as fiber-reinforced plastic or the like.

The composite material product using a cloth, which is produced using the thread made of a specific fiber, and a resin has excellent physical characteristics of being light and having high strength relative to the lightness. Accordingly, as described above, rather than applications of such composite material product being mainly industrial uses, approximately 100% of its uses are industrial uses.

SUMMARY OF INVENTION

Technical Problem

As described above, the composite material product is often used with attention focused on its excellent physical characteristics. Of course, the excellent physical characteristics of the composite material product are outstanding. However, it may be said that almost no efforts are currently made in terms of its aesthetic appearance. The inventor of the present application thinks that the current situation is unfortunate indeed.

Nevertheless, particularly when the resin included in the composite material product is transparent, the cloth included in the composite material product, in particular, the woven pattern of a woven fabric appears on the front surface of the composite material product in a manner visible from outside. For example, it is possible to produce, as the woven fabric, a woven fabric having a woven pattern of black and red threads by using, in its weaving, a black thread made of a carbon fiber and a thread made of an aramid fiber that is colored, for example, red. Through utilization of this, a composite material product having a pattern derived from the woven pattern does exist rather than not.

However, the pattern derived from the folded pattern does not have a high degree of freedom, and can hardly be said to be sufficient in terms of aesthetic appearance. If a freer design can be imparted to a composite material product, a new demand for the composite material product may be generated.

An object of the present invention is to provide a technology for imparting a design having a higher degree of freedom than in the related art to a composite material product including a cloth, which is formed of a thread made of a specific fiber, and a resin.

Solution to Problem

The inventor of the present application has made investigations in order to achieve the above-mentioned object. As a result, the following idea has been obtained: when a specific fiber cloth that is a cloth formed of a thread made of a specific fiber to be used for a composite material product is further embroidered with a thread made of a specific fiber like the embroidery of a general cloth, it may be possible to provide the specific fiber cloth with a design having a high degree of freedom.

However, when the above-mentioned idea was put into practice, the following problem occurred: when the specific fiber cloth was embroidered with the thread made of a specific fiber, a gap was formed between threads each made of a specific fiber forming the specific fiber cloth, and further, the gap spread to become some kind of crack to cause a disturbance in texture alignment, occurrence of partial wrinkling, or deformation, thereby disturbing front surface smoothness, with the result that value in terms of aesthetic appearance was significantly impaired owing to a remarkable degradation in design property. As a result, the finally obtained composite material product was observed to have, as part thereof, a site insufficient in terms of strength.

Then, as a result of further trial and error, the inventor of the present application has established a technology that achieves the above-mentioned object including solving such problem.

The invention proposed by the inventor of the present application is as described below.

The present invention is directed to a method of manufacturing a composite material product including a specific fiber cloth that is a cloth formed of a thread made of a specific fiber that is at least one of a carbon fiber, an aramid fiber, or a glass fiber (hereinafter sometimes referred to simply as "manufacturing method").

Such manufacturing method includes: a first step of stacking a backing sheet which is a sheet on a back surface side of the specific fiber cloth; a second step of performing embroidery with an embroidery thread that is the thread made of a specific fiber so that a desired design is formed on a front surface side of the specific fiber cloth, and so that the embroidery thread penetrates through both the specific fiber cloth and the backing sheet; and a third step of solidifying (encompassing solidifying by curing. The same applies hereinafter) the specific fiber cloth and the backing sheet with a transparent resin after the second step, to obtain the composite material product.

The manufacturing method includes the second step of performing embroidery with an embroidery thread that is the thread made of a specific fiber so that a desired design is obtained on the specific fiber cloth. This is based on the above-mentioned idea of the inventor of the present application. However, when the idea is merely put into practice, such problem as described above occurs. The problem is eliminated in the present invention through use of the backing sheet. The backing sheet is stacked on the back surface side of the specific fiber cloth in the first step. Under this state, embroidery is performed with the embroidery thread in the second step. The embroidery thread is caused to penetrate through both the specific fiber cloth and the backing sheet. Consequently, in the specific fiber cloth after the embroidery, the disturbance in front surface smoothness of the embroidered part, which serves as a cause for the remarkable degradation in design property, is suppressed. Such improvement occurs presumably because, though a minimum gap due to a stitching needle occurs in the arrangement of the thread forming the specific fiber cloth owing to the embroidery, the use of the backing sheet can allow part of a tearing stress to be borne on the backing sheet, and hence can suppress the spread of the slight gap (crack) occurring on the surface of the cloth by virtue of a mutually reinforcing effect between the backing sheet and the specific fiber cloth.

Then, after the second step, the third step of curing the embroidered specific fiber cloth and the backing sheet with a transparent resin is performed. In the resulting composite material product, partly because the design formed on the front surface side of the specific fiber cloth is aesthetically pleasing, the design formed on the front surface side of the specific fiber cloth by embroidery is visible from the front surface side of the composite material product, and besides, the design is aesthetically pleasing.

In the present application, the "front side" and the "back side" of the specific fiber cloth are defined as follows: the side of the specific fiber cloth on which the desired design is to be formed by embroidery is the front side, and the side opposite thereto is the back side. The definitions of the front side and the back side of the backing sheet and composite material product follow the definitions of the front side and the back side of the specific fiber cloth.

In addition, the "specific fiber cloth" in the present application encompasses cloth-like products in general each produced using the thread made of a specific fiber, and encompasses at least, for example, a woven fabric produced by weaving the thread, a knitted fabric produced by knitting the thread, a so-called uni-directional (UD) tape in which the thread is aligned in one direction, and a nonwoven fabric obtained by depositing fibers in a random orientation to form a sheet shape or a mat shape.

As described above, in the third step, the specific fiber cloth and the backing sheet are solidified with a resin. Such third step for solidifying the specific fiber cloth and the backing sheet may be based on a step for curing, with a resin, a specific fiber cloth used for obtaining a related-art composite material product.

For example, the third step may include curing the specific fiber cloth and the backing sheet, which are in a state of having another specific fiber cloth stacked on a back surface side thereof, with a transparent resin, to obtain the composite material product. With this, an adjustment can be made toward increasing the thickness of the composite material product.

In addition, in the third step, the specific fiber cloth and the backing sheet may be cured with a transparent resin by a resin film infusion method (RFI method) or a resin transfer molding method (RTM method) to obtain the composite material product.

The RFI method is a known technique which, roughly speaking, involves placing a specific fiber cloth, in a state of having a solid resin (sheet made of a resin) stacked on its surface on at least one side, in a mold, and evacuating the inside of the mold, followed by pressurization under heating, to thereby cure the specific fiber cloth with the resin. In this case, the solid resin is a thermoplastic resin or a thermosetting resin. When the thermoplastic resin is used, the thermoplastic resin that has temporarily become liquid through the heating impregnates the specific fiber cloth, and is then cooled to become solid again, to thereby solidify the specific fiber cloth. When the thermosetting resin is used, the liquid thermoplastic resin liquid that has impregnated the specific fiber cloth is solidified through a curing reaction caused by the heating. In the RFI method, the thermoplastic resin is often selected generally because of a short processing time.

The RTM method is also a known technique which roughly speaking, involves pouring a liquid resin into a mold under a state in which a specific fiber cloth is placed in the mold, followed by pressurization under heating, to thereby cure the specific fiber cloth with the resin. In this case, a thermosetting resin is often used as the liquid resin and is caused to impregnate the specific fiber cloth while in a liquid state, and the solidification of the specific fiber cloth progresses through a curing reaction caused by the heating.

In the third step, the resin needs to impregnate the specific fiber cloth and the backing sheet at least from their back surface side, but does not need to impregnate the specific fiber cloth and the backing sheet from their front surface side. That is, the back side of the composite material product to be finally obtained needs to be covered with the resin, but its front side may not be covered with the resin.

For example, when the RFI method or the RTM method is used, the third step involves heating.

In the case where the third step involves heating, which is not limited to the case of using the RFI method or the RTM method, the backing sheet to be used may be a backing sheet formed of a resin that is melted by the heating in the third step to be integrated with the resin used in the third step. In this case, the resin for forming the backing sheet is a thermoplastic resin.

When the backing sheet is as described above, in the composite material product to be finally obtained, the backing sheet is integrated with the resin for curing the specific fiber cloth and the backing sheet to blur their boundary. Accordingly, the presence of the backing sheet becomes inconspicuous to a person who looks at the composite material product, and hence the aesthetic appearance of the composite material product may be further improved. For example, when the resin for forming the backing sheet and the resin for solidifying the specific fiber cloth and the backing sheet are the same material, or when both the resins are at least thermoplastic resins, both are integrated without any problem, but both the resins do not necessarily need to be the same material. In addition, when the presence of the composite material product to be finally obtained is to be made more inconspicuous, it is appropriate to select, as the resin for forming the backing sheet, a resin that becomes transparent when solidified again after melted.

In the manufacturing method of the present application, the third step may involve heating, and the backing sheet to be used may be a backing sheet formed of a material that retains its shape even after the heating in the third step.

In this case, the backing sheet remains in the composite material product to be finally obtained. Nevertheless, even when the backing sheet remains, the backing sheet is hidden on the back side of the specific fiber cloth, and hence is not highly likely to impair the aesthetic appearance of the composite material product.

As the backing sheet formed of the material that retains its shape even after the heating in the third step, there may be used, for example, paper or a thin sheet formed of metal mesh or leather. The backing sheet formed of paper can suppress an unnecessary rise in manufacturing cost of the composite material product. In addition, the paper comes in, for example, ready-made products with a variety of variations in thickness, and hence the rise in manufacturing cost of the composite material product can also be suppressed depending on the design of the composite material product.

As described above, in the second step, a design is formed on the front surface side of the specific fiber cloth by embroidery. Such design is not particularly limited. For example, a design having multiple colors may be formed through use of a plurality of kinds of embroidery threads having different colors.

The design to be formed in the second step may be a filled figure filled with the embroidery thread substantially without any gap. With this, embroidery density can be increased without a concern for a disadvantage based on the occurrence of a gap in the specific fiber cloth, and hence a more highly aesthetic design can be formed.

The backing sheet is arranged along the back surface of the specific fiber cloth, and needs to be caused to at least cover the specific fiber cloth at a position corresponding to the design to be formed on the specific fiber cloth, from the back surface side of the specific fiber cloth. In addition, the specific fiber cloth may be solidified, while retaining its state at the time of the completion of the second step, with the resin together with the specific fiber cloth in the third step.

Meanwhile, the manufacturing method of the present application may further include, after the second step, a step of removing part of the backing sheet positioned outside the design along a contour of the design, wherein the third step includes solidifying the specific fiber cloth and the backing sheet having the part positioned outside the design removed with a transparent resin, to obtain the composite material product.

With this, the following effect is obtained. For example, in the case of using, as the backing sheet, a backing sheet formed of a resin that is melted by the heating in the third step to be integrated with the resin used in the third step, adhesiveness between the resins is maximized, and hence the strength of the composite material product is improved.

In addition, in the case of using, as the backing sheet, the material that retains its shape even after the heating in the third step, such as paper, the following effect may be obtained depending on the thickness of the backing sheet: the design can be raised in relief as part of the composite material product to be finally obtained.

DESCRIPTION OF EMBODIMENTS

Figure 1:
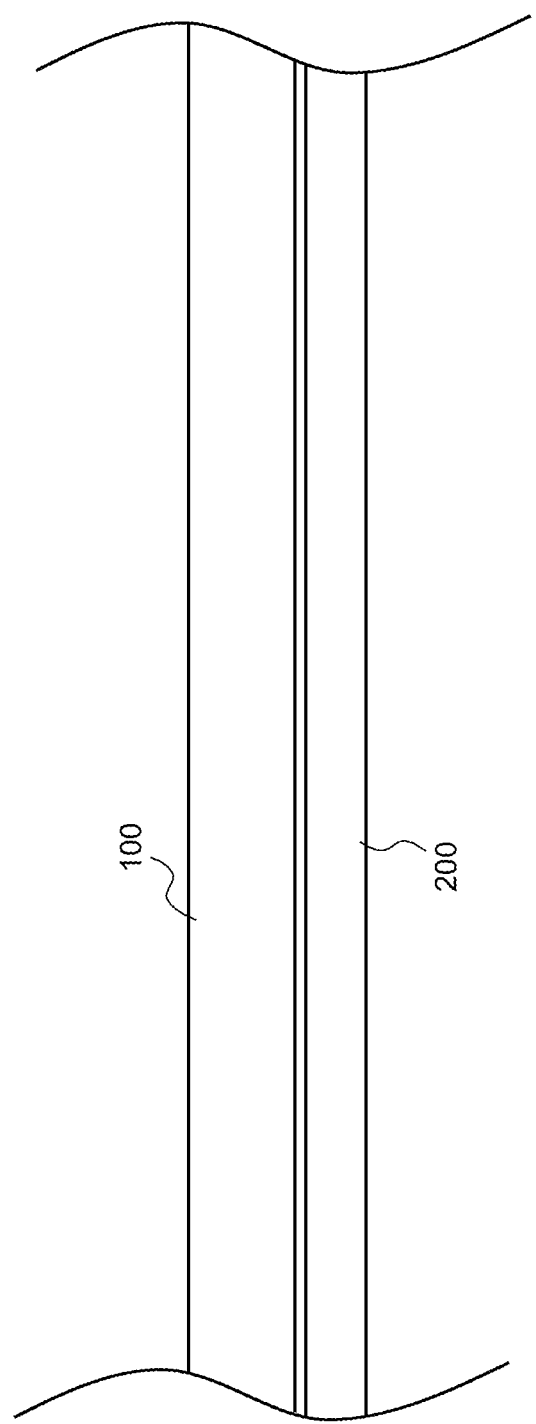
FIG. 1 is a cross-sectional view for illustrating a state after a first step has been performed in a first embodiment of the present invention.

First and second embodiments of the present invention, and modified examples thereof are described below with reference to the drawings. In the embodiments and the modified examples, like objects are denoted with like reference numerals, and overlapping descriptions may be omitted.

In addition, matters based on descriptions made in the embodiments and the modified examples may be combined in any manner except when the matters described therein cannot be combined.

First Embodiment

A method of manufacturing a composite material product according to the first embodiment is described.

In the manufacturing method according to the first embodiment, as a first step, first, as illustrated in FIG. 1, a specific fiber cloth 100 and a backing sheet 200 are stacked. In FIG. 1, the upper side corresponds to the front surface side of the specific fiber cloth 100.

The backing sheet 200 is arranged along the back side of the specific fiber cloth 100. In this embodiment, the specific fiber cloth 100 and the backing sheet 200 have the same shape and size, and are each, for example, a square about 2 m on a side, though not limited thereto. The shape and size of the specific fiber cloth 100 are set to a shape and size equal to or larger than the shape and size of the composite material product to be finally obtained. In this embodiment, the composite material product to be finally obtained is intended to be a hood of an automobile as described later, though not limited thereto. Therefore, the size of the specific fiber cloth 100 is set to a shape and size that are one size larger than those of the composite material product serving as a hood.

In this embodiment, the specific fiber cloth 100 and the backing sheet 200 are stacked so as to fit together exactly, though not limited thereto. Nevertheless, it suffices that the backing sheet 200, when stacked on the specific fiber cloth 100, cover all that area of the specific fiber cloth 100 which corresponds to an area in which a design to be described later is formed, from the back surface side of the specific fiber cloth 100. That is, the backing sheet 200 does not need to have the same shape and size as the specific fiber cloth 100, and does not need to be stacked on the specific fiber cloth 100 so that the specific fiber cloth 100 and the backing sheet 200 fit together exactly.

The specific fiber cloth 100 is a cloth produced using a thread made of a specific fiber, and in this embodiment, is a woven fabric woven using the thread made of a specific fiber, though not limited thereto. As described above, the specific fiber cloth 100 may be a knitted fabric produced using the thread made of a specific fiber, or may be a UD tape or nonwoven fabric produced using a similar thread.

As also described above, the specific fiber is a collective term for a carbon fiber, a glass fiber, and an aramid fiber. The thread made of a specific fiber may be formed of only one kind out of those three kinds of specific fibers, but may be obtained by mixing and bundling a plurality of kinds out of those three kinds of specific fibers. A typical example of the aramid fiber is a synthetic fiber sold with the trademark Kevlar by E. I. du Pont de Nemours and Company, USA. The thread made of a specific fiber is produced by bundling a large number of extremely thin specific fibers until a desired thickness is achieved. For example, when the specific fiber is the carbon fiber, the thread made of a specific fiber may be set to from 1 k to 12 k (obtained by bundling 1,000 to 12,000 carbon fibers).

The specific fiber cloth 100 may be a commercially available cloth.

The backing sheet 200 has a sheet shape, and in this embodiment, is formed of a resin. The resin may be a thermosetting resin or a thermoplastic resin. Examples of the resin when the resin is a thermosetting resin include epoxy, unsaturated polyester, and phenol, and besides, vinyl ester, urea, melamine, and polyurethane, or modified resins thereof, such as a modified urethane resin (an epoxy urethane resin) and a modified novolac resin (an epoxy novolac resin), and an epoxy vinyl ester resin. Examples of the resin when the resin is a thermoplastic resin include polyethylene, polypropylene, polystyrene, a polyester resin (PET), nylon, and PEEK, polyphenylene sulfide (PPS), polyether ketone (PEK), and polyetherimide (PEI) serving as super engineering plastics.

In this embodiment, description is continued on the assumption that the backing sheet 200 is a thermoplastic resin, more specifically PET, though not limited thereto.

Figure 2:
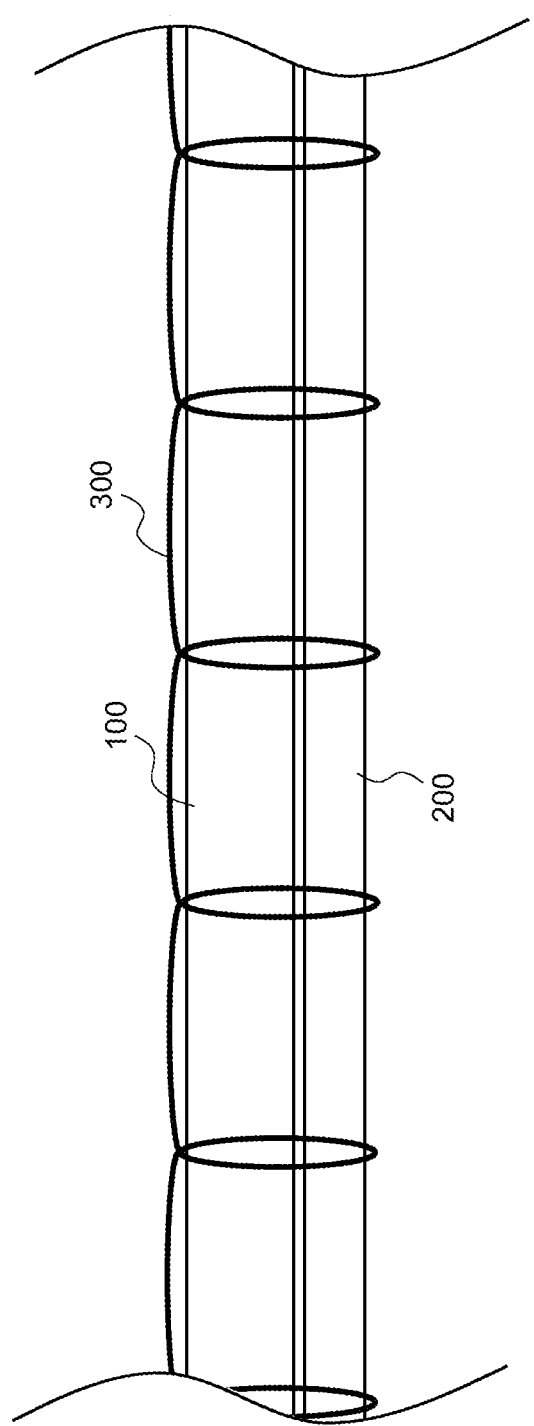
FIG. 2 is a cross-sectional view for illustrating a state after a second step has been performed in the first embodiment of the present invention.

Next, as a second step, the stacked specific fiber cloth 100 and backing sheet 200 are embroidered with an embroidery thread 300 (FIG. 2 and FIG. 3(A)).

The embroidery is performed so that a desired design 301 is formed on the front surface of the specific fiber cloth 100 by the embroidery thread 300. The embroidery is performed so that the embroidery thread 300 penetrates through both the specific fiber cloth 100 and the backing sheet 200. It is appropriate to use, as a stitch to be used when the embroidery is performed, a known or well-known stitch used in general embroidery to be performed for a general cloth using a general thread. For example, a long and short stitch, a satin stitch, or a lockstitch may be used.

Figure 3:
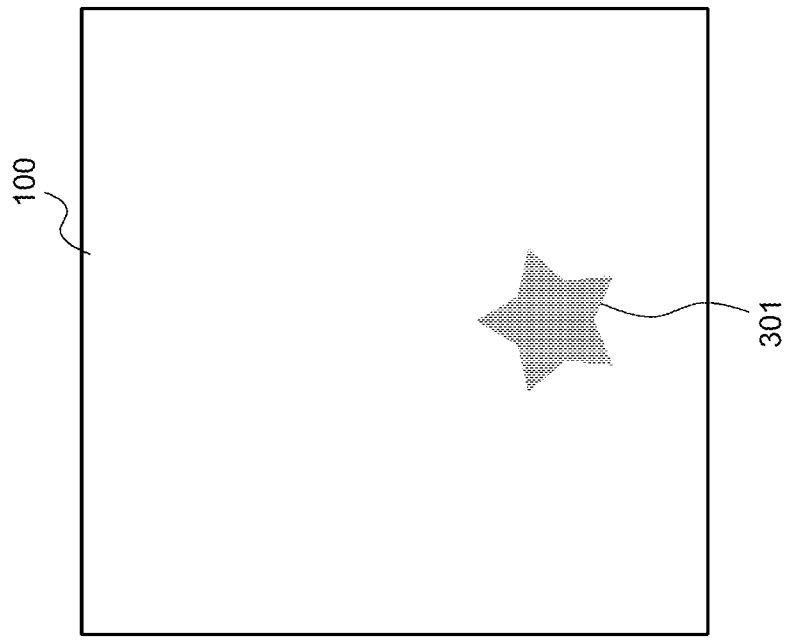
FIG. 3(A) is a plan view for illustrating a state after the second step has been performed in the first embodiment of the present invention.
FIG. 3(B) is a plan view for illustrating a state after a shaping step has been performed after the second step.
Figure 3:
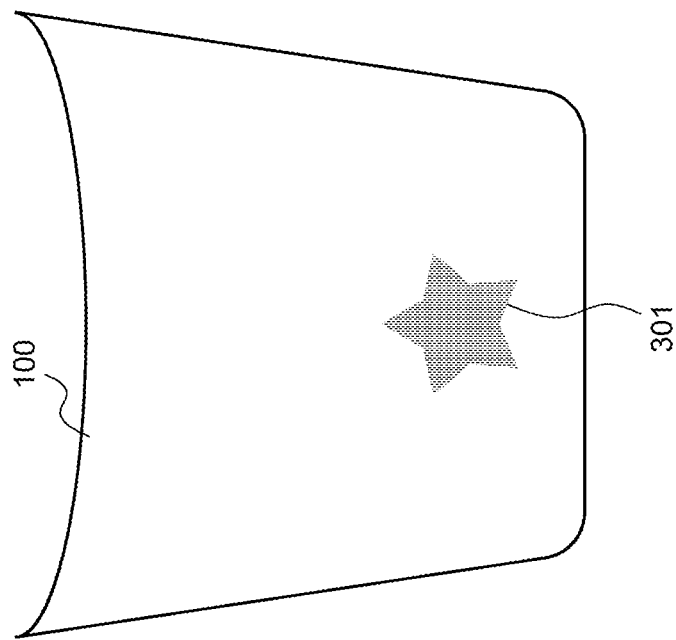

The design 301 to be formed by the embroidery may be any design, but in this embodiment, the design to be formed on the front surface of the specific fiber cloth 100 is a filled figure filled with the embroidery thread 300 substantially without any gap, though not limited thereto. In this embodiment, as illustrated in FIG. 3, a star-shaped filled figure serves as the design 301, which is not limited thereto.

The embroidery thread 300 is the thread made of a specific fiber. The specific fiber is as described above, and the thread made of a specific fiber is also as described above. When embroidery threads having a plurality of different kinds of colors are used as the embroidery thread 300, a design including multiple colors can be obtained as in general embroidery. The carbon fiber is usually black, but the glass fiber and the aramid fiber can each be colored a desired color. Therefore, a design including a plurality of colors may be obtained by combining embroidery threads of desired colors. In addition, depending on a method for the embroidery, it is also possible to form a three-dimensional bulge of some degree on the design.

Next, the specific fiber cloth 100 and the backing sheet 200 after the completion of the embroidery are shaped into the shape of the composite material product as required. The composite material product in this embodiment is a hood of an automobile as described above, and hence the specific fiber cloth 100 and the backing sheet 200 are shaped into, for example, such a shape as illustrated in FIG. 3(B). A method for the shaping may be any method, but in this embodiment, the shaping is performed by cutting the specific fiber cloth 100 and the backing sheet 200 together by a known or well-known method.

In this embodiment, the specific fiber cloth 100 and the backing sheet 200 are shaped into the same shape and size.

Next, as a third step, the specific fiber cloth 100 and the backing sheet 200 after the completion of the shaping are subjected to solidification (including curing) with a transparent resin as required, and thus the composite material product is finished. The resin being transparent means that the resin used for the curing of the specific fiber cloth 100 and the backing sheet 200 is transparent at the time when the composite material product is finished. The transparency in this case may be colorless transparency or colored transparency.

A method of solidifying the specific fiber cloth 100 and the backing sheet 200 may be the same as a method of solidifying, with a resin, a specific fiber cloth used for obtaining a related-art composite material product.

For example, the specific fiber cloth 100 and the backing sheet 200 may be solidified or cured using the RFI method or the RTM method.

In this embodiment, the specific fiber cloth 100 and the backing sheet 200 are solidified using the RFI method, though the method is not limited thereto.

As described above, the related-art RFI method involving curing a specific fiber cloth with a resin is a known technique involving placing a specific fiber cloth, in a state of having a solid resin (sheet made of a resin) stacked on its surface on at least one side, in a mold, and evacuating the inside of the mold, followed by pressurization under heating, to thereby solidify the specific fiber cloth with the resin. When the solid resin is a thermoplastic resin, the resin temporarily becomes liquid through the heating to impregnate the specific fiber cloth, and is then cooled to become solid again, to thereby solidify the specific fiber cloth.

Figure 4:
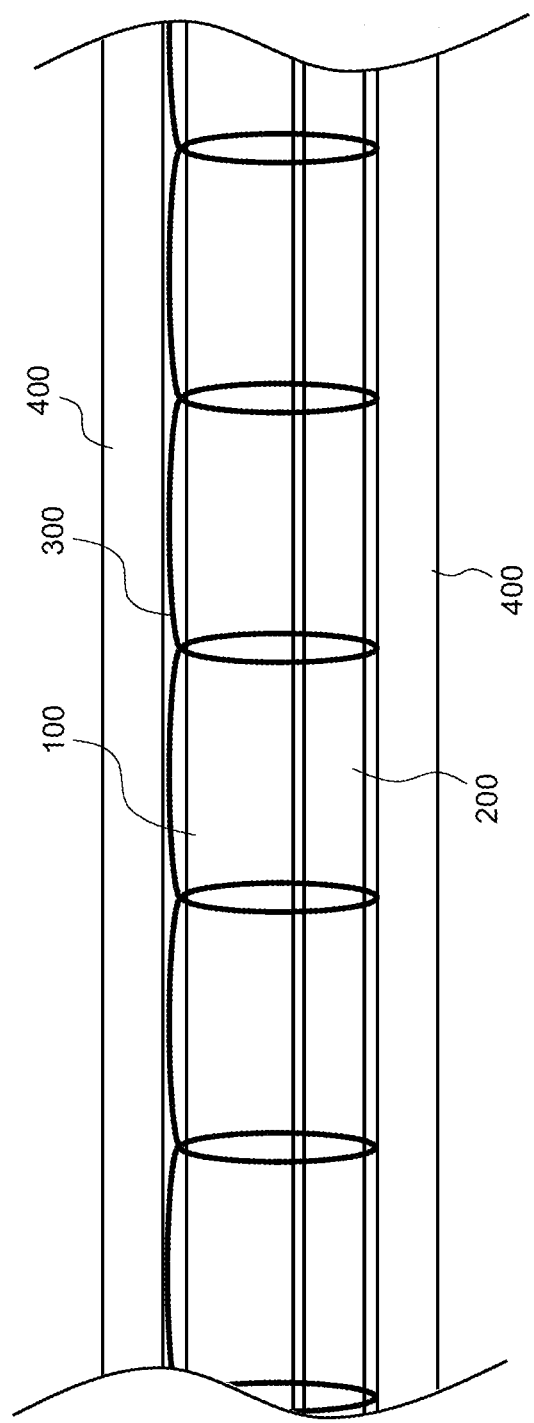
FIG. 4 is a cross-sectional view for illustrating a state before heating is performed during a third step in the first embodiment of the present invention.

In this embodiment, the specific fiber cloth in the related-art RFI method is replaced with the specific fiber cloth 100 and the backing sheet 200. The specific fiber cloth 100 and the backing sheet 200 are, for example, as illustrated in FIG. 4, sandwiched between resin sheets 400, which are sheets each made of a resin, which are arranged on both surfaces of the specific fiber cloth 100 and the backing sheet 200. In this case, examples of the resin that may be used for forming each of the resin sheets 400 include: thermoplastic resins, such as polyethylene, polypropylene, a polyester resin (PET), nylon, and polyphenylene sulfide (PPS); and thermosetting resins, such as epoxy, unsaturated polyester, phenol, vinyl ester, urea, melamine, and polyurethane. The resin sheets 400 are set to a shape and size corresponding to the specific fiber cloth 100 and the backing sheet 200. In addition, the thicknesses of both the resin sheets 400 may be decided depending on thicknesses needed for a front resin layer and a back resin layer, which are described later, and their thicknesses do not necessarily need to be the same.

Figure 5:
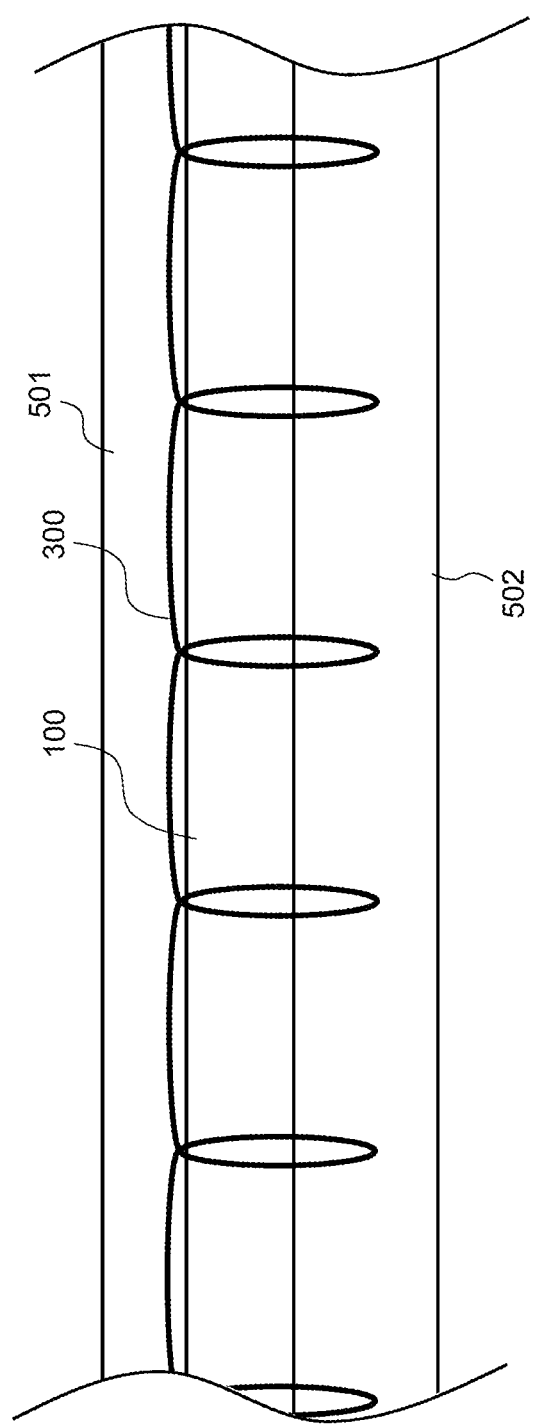
FIG. 5 is a cross-sectional view for illustrating a state after the third step has been performed in the first embodiment of the present invention.

The specific fiber cloth 100 and the backing sheet 200 sandwiched by the two resin sheets 400 (herein, description is made by taking as an example a case in which the resin sheets 400 are each made of a thermoplastic resin) are placed in a mold (not shown). Under this state, the inside of the mold is heated in an evacuated state to melt both the resin sheets 400 and the backing sheet 200. The temperature of the heating is increased to a temperature that enables the melting. The resin sheets 400 and the backing sheet 200 are melted, and at least parts thereof impregnate the specific fiber cloth 100. After that, resins derived from the resin sheets 400 and the backing sheet 200 are cooled to be solidified. Consequently, the specific fiber cloth 100 is brought into the following state: its front surface side is covered with a front resin layer 501 formed mainly of a resin derived from the resin sheet 400 on the upper side of FIG. 4; and its back surface side is covered with a back resin layer 502 formed mainly of resins derived from the backing sheet 200 and the resin sheet 400 on the lower side of FIG. 4 (FIG. 5).

Thus, the composite material product is finished.

In the composite material product, the design 301 formed by the embroidery thread 300 is brought into a state of being visible through the front resin layer 501, which is transparent. In addition, when the design 301 is three-dimensional to some degree, part of the front surface side of the composite material product where the design 301 is present is brought into a state of somewhat bulging from part thereof where the design 301 is absent.

In addition, when the resin forming each of the resin sheets 400 and the resin forming the backing sheet 200 are such resins as to be both melted through heating and integrated after curing, resins derived from the resin forming each of the resin sheets 400 and from the backing sheet 200 become no longer distinguishable after their curing, with the result that a boundary based on a boundary between the backing sheet 200 and the resin sheet 400 on the lower side of FIG. 4 becomes no longer recognizable. For example, when the resin forming the backing sheet 200 and the resin forming each of the resin sheets 400 are formed of the same material, the resins are integrated in a state of having no boundary at all. However, even when the resins derived from the resin forming each of the resin sheets 400 and from the backing sheet 200 are not the same material, their boundary can be made indistinguishable at least visually.

In this embodiment, when the third step is performed, the specific fiber cloth 100 and the backing sheet 200 are sandwiched between the resin sheets 400 arranged on both their front and back surfaces, but it is also appropriate that the resin sheet 400 be arranged only on at least one side thereof. Particularly when the resin sheet 400 on the front surface side of the specific fiber cloth 100 is omitted, the front surface side of the composite material product may not be covered with the resin, which is acceptable as the composite material product according to the present invention.

In addition, the front surface of the front resin layer 501 of the composite material product obtained in this embodiment may be coated with an appropriate paint within an area outside the design.

Modified Example 1

In a method of manufacturing a composite material product according to Modified Example 1, the first step and the second step are the same as those in the first embodiment, and only the third step is different from that in the case of the first embodiment. In the first embodiment, the specific fiber cloth 100 and the backing sheet 200 are solidified using the RFI method, but in Modified Example 1, the specific fiber cloth 100 and the backing sheet 200 are solidified using the RIM method.

As described above, the related-art RTM method involving curing a specific fiber cloth with a resin is a known technique involving pouring a liquid resin into a mold under a state in which the specific fiber cloth is placed in the mold, followed by pressurization under heating, to thereby solidify the specific fiber cloth with the resin. In this case, the liquid resin is a thermosetting resin, and the resin that has impregnated the specific fiber cloth while in a liquid state cures the specific fiber cloth through a curing reaction caused by the heating.

In this embodiment, the specific fiber cloth in the related-art RIM method is replaced with the specific fiber cloth 100 and the backing sheet 200. The resin to be injected into a mold having the specific fiber cloth 100 and the backing sheet 200 placed therein is a thermosetting resin as described above, and examples of the material thereof include epoxy, unsaturated polyester, and phenol, and besides, vinyl ester, urea, melamine, and polyurethane, or modified resins thereof, such as a modified urethane resin (an epoxy urethane resin), a modified novolac resin (an epoxy novolac resin), and an epoxy vinyl ester resin. In this case, the resin for forming the backing sheet 200 may be a thermosetting resin, but is preferably a thermoplastic resin. This is because the backing sheet 200 is melted during the heating when its material is a thermoplastic resin, but is not melted when its material is a thermosetting resin. The resin for curing the specific fiber cloth 100 and the backing sheet 200, which is a thermosetting resin, and the resin for forming the backing sheet 200, which is a thermoplastic resin, are preferably as follows: the latter melts at a temperature lower than a temperature at which the former cures.

The resin for curing the specific fiber cloth 100 and the backing sheet 200 is poured into a mold (not shown) having the specific fiber cloth 100 and the backing sheet 200 placed therein, and under this state, pressurization and heating are performed. In this case, if the temperature at which the resin for curing the specific fiber cloth 100 and the backing sheet 200, which is a thermosetting resin, cures is higher than the temperature at which the resin for forming the backing sheet 200, which is a thermoplastic resin, melts, both the resins temporarily become liquid to mix with each other to impregnate the specific fiber cloth 100. After that, when the temperature is further increased to cure the thermosetting resin and then the temperature is decreased to solidify the thermoplastic resin, a composite material product similar to that in the case of the first embodiment can be obtained. More specifically, the composite material product is brought into a state of having its front surface side covered with the front resin layer and having its back surface side covered with the back resin layer.

In the same manner as in the case of the first embodiment, in the composite material product of Modified Example 1, the design formed by the embroidery thread 300 is brought into a state of being visible through the front resin layer, which is transparent. In addition, when the design is three-dimensional to some degree, part of the front surface side of the composite material product where the design is present is brought into a state of somewhat bulging from part thereof where the design is absent.

In addition, when the resin forming each of the resin sheets 400 and the resin forming the backing sheet 200 satisfy such conditions as described above, the resins are integrated after curing, and hence their boundary is at least blurred.

Modified Example 2

In a method of manufacturing a composite material product according to Modified Example 2, the first step and the second step are identical to those in the case of the first embodiment.

In Modified Example 2, after the completion of the second step, part of the backing sheet 200 not corresponding to the design, i.e., part not embroidered with the embroidery thread 300 is removed along the contour of the design. The removal of the part of the backing sheet 200 not embroidered with the embroidery thread 300 may be performed by, for example, a known technology or a well-known technology, such as cutting of the backing sheet 200. In addition, the removal of the part of the backing sheet 200 not embroidered with the embroidery thread 300 may be performed before or after the shaping of the specific fiber cloth 100 and the backing sheet 200.

After that, the third step may be performed in the same manner as in the case of the first embodiment or Modified Example 1, but in this embodiment, the third step is performed after a different specific fiber cloth 101 from the above-mentioned specific fiber cloth 100 that has been embroidered is further added to the back side of the backing sheet 200. The new specific fiber cloth 101 has the same shape and size as the specific fiber cloth 100 that has been embroidered after shaping, and both the specific fiber cloths 100 and 101 are stacked to fit together perfectly so as not to protrude from each other (see FIG. 6).

Figure 6:
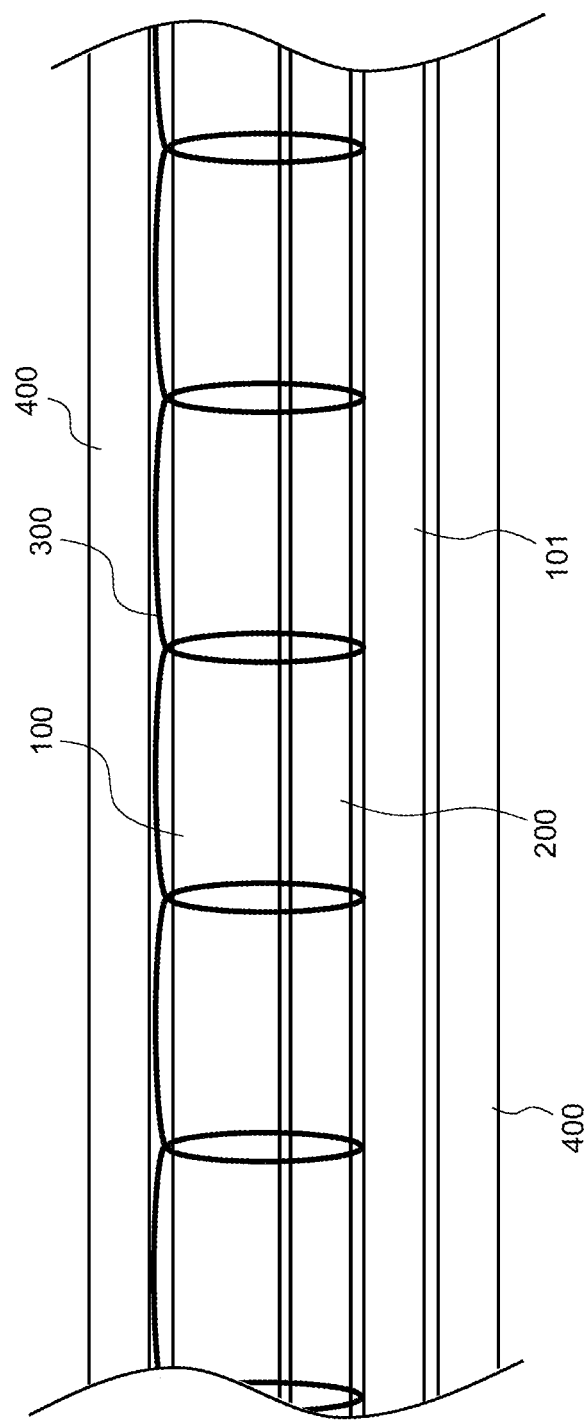
FIG. 6 is a cross-sectional view for illustrating a state before heating is performed during the third step in Modified Example 2 of the present invention.

After that, for example, in the same manner as described above in the first embodiment, as illustrated in FIG. 6, the specific fiber cloths 100 and 101 and the backing sheet 200 are sandwiched between the resin sheets 400 and then the whole is placed in a mold, and under an evacuated state, pressurization and heating are performed.

The composite material product to be thus obtained is mostly the same as the one obtained in the first embodiment, but part of the front surface of the specific fiber cloth 100 where the design 301 is present has a somewhat larger degree of protrusion from its periphery as compared to the case of the first embodiment.

Second Embodiment

A method of manufacturing a composite material product according to the second embodiment is mostly the same as that in the case of the first embodiment.

The method of manufacturing a composite material product according to the second embodiment differs from that in the case of the first embodiment in that the backing sheet 200 in the second embodiment is formed of a material that retains its shape even after the heating to be performed in the third step.

The backing sheet 200 in the second embodiment is formed of, for example, paper, or when made of a resin, is formed of a thermosetting resin. In this embodiment, the backing sheet 200 is formed of paper. The thickness of the paper may be decided depending on the degree of the protrusion at the site of the design to be described later. The backing sheet 200 may be formed of a sheet of leather or metal mesh in place of the paper. The thickness of the backing sheet 200 may be set to, for example, from 25 μm to 200 μm in the composite material product.

In the second embodiment, first, in the same manner as in the case of the first embodiment, except for changing only the material for the backing sheet 200, the first step and the second step described in the first embodiment are performed. Then, also in the second embodiment, shaping similar to that in the case of the first embodiment is performed.

Subsequently, in the second embodiment, part of the backing sheet 200 outside the design is removed along the contour of the design as described in Modified Example 2, though this is not essential.

Under that state, the third step is carried out. In the second embodiment, the shape of the backing sheet 200 is retained even after the third step involving heating has been performed, and hence it does not matter whether the RFI method is selected or the RTM method is performed in the third step.

When the third step of curing the specific fiber cloth 100 and the backing sheet 200 is completed, the composite material product is obtained.

Figure 7:
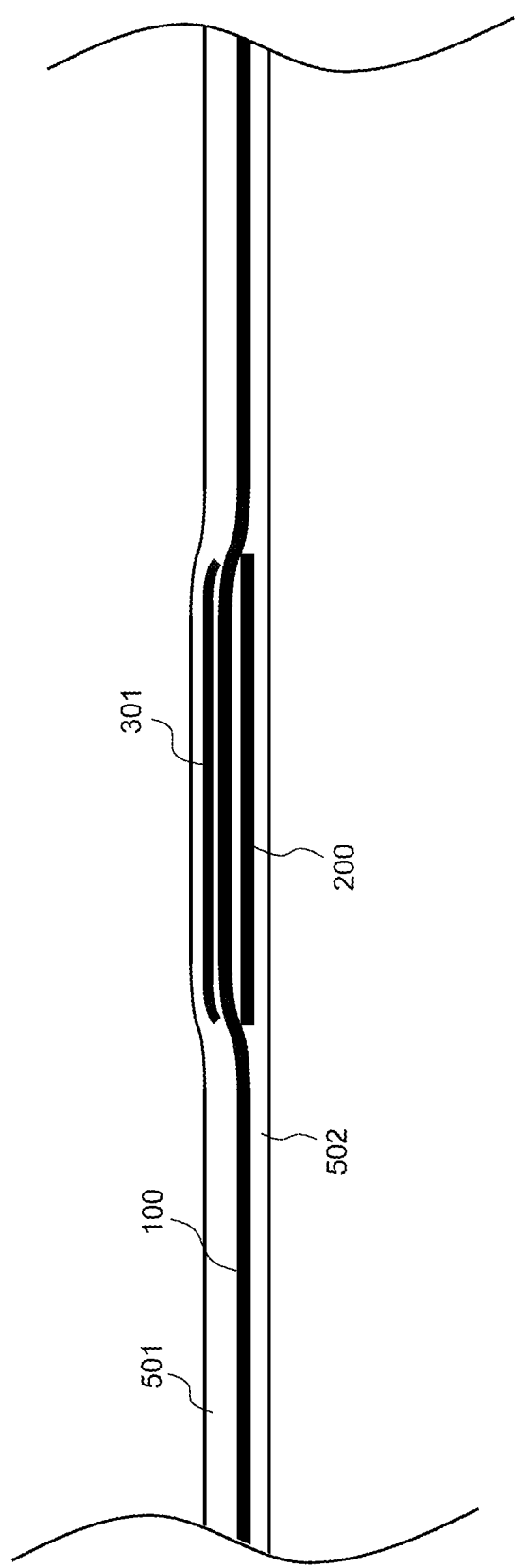
FIG. 7 is a cross-sectional view for illustrating a wider range of a composite material product obtained according to a second embodiment of the present invention than FIG. 5.

In this case, as illustrated in FIG. 7, the backing sheet 200 remains on the back surface side of the specific fiber cloth 100 at a position in the finally obtained composite material product where the design 301 is present. Therefore, in the composite material product to be obtained by the manufacturing method according to the second embodiment, part of the front surface on the front surface side of the front resin layer 501 where the design 301 is present bulges more significantly as compared to its periphery where the design 301 is absent, because of the effect of the thickness of the backing sheet 200, than in the case of the composite material product obtained by the manufacturing method according to the first embodiment.

REFERENCE SIGNS LIST 100 specific fiber cloth
101 specific fiber cloth
200 backing sheet
300 embroidery thread
301 design
400 resin sheet
501 front resin layer
502 back resin layer

The invention claimed is:

1. A method of manufacturing a composite material product including a specific fiber cloth that is a cloth formed of a thread made of a specific fiber, which is at least one of a carbon fiber, an aramid fiber, or a glass fiber,
the method comprising:
a first step of stacking a backing sheet which is a sheet on a back surface side of the specific fiber cloth;
a second step of performing embroidery with an embroidery thread that is the thread made of a specific fiber so that a desired design is formed on a front surface side of the specific fiber cloth, and so that the embroidery thread penetrates through both the specific fiber cloth and the backing sheet, wherein the design to be formed in the second step is a filled figure filled with the embroidery thread substantially without any gap; and
a third step of solidifying the specific fiber cloth and the backing sheet with a transparent resin after the second step, to obtain the composite material product.

2. The method of manufacturing a composite material product according to claim 1,
wherein the third step involves heating, and
wherein the backing sheet to be used is a backing sheet formed of a resin that is melted by the heating in the third step to be integrated with the resin used in the third step.

3. The method of manufacturing a composite material product according to claim 1, wherein the third step involves heating, and
wherein the backing sheet to be used is a backing sheet formed of a material that retains its shape even after the heating in the third step.

4. The method of manufacturing a composite material product according to claim 3, wherein the backing sheet to be used is a backing sheet formed of paper.

5. The method of manufacturing a composite material product according to claim 4, further comprising, after the second step, a step of removing part of the backing sheet positioned outside the design along a contour of the design,
Wherein the third step comprises solidifying the specific fiber cloth and the backing sheet having the part positioned outside the design removed with a transparent resin, to obtain the composite material product.

6. The method of manufacturing a composite material product according to claim 1, wherein the third step comprises solidifying the specific fiber cloth and the backing sheet, which are in a state of having another specific fiber cloth stacked on a back surface side thereof, with a transparent resin, to obtain the composite material product.

7. The method of manufacturing a composite material product according to claim 1, wherein the third step comprises solidifying the specific fiber cloth and the backing sheet with a transparent resin by an RFI method or an RTM method, to obtain the composite material product.

* * * * *